US006927763B2

(12) United States Patent
La Monica

(10) Patent No.: US 6,927,763 B2
(45) Date of Patent: Aug. 9, 2005

(54) METHOD AND SYSTEM FOR PROVIDING A DISAMBIGUATED KEYPAD

(75) Inventor: Donald P. La Monica, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 136 days.

(21) Appl. No.: 10/331,408

(22) Filed: Dec. 30, 2002

(65) Prior Publication Data

US 2004/0135774 A1 Jul. 15, 2004

(51) Int. Cl.[7] ................................................ G09G 5/00
(52) U.S. Cl. ...................... 345/174; 178/18.06; 341/23; 341/33
(58) Field of Search ............................. 178/18–20, 20.01; 345/173–178; 341/22–34; 235/145–146; 708/142–146; 340/407.2

(56) References Cited

U.S. PATENT DOCUMENTS

| | | | | |
|---|---|---|---|---|
| 3,567,859 A | * | 3/1971 | Ellis et al. ............... | 178/19.01 |
| 5,847,697 A | | 12/1998 | Sugimoto ................... | 345/168 |
| 5,861,875 A | | 1/1999 | Gerpheide ................... | 345/174 |
| 5,945,928 A | | 8/1999 | Kushler et al. ............... | 341/28 |
| 5,982,357 A | * | 11/1999 | Burgett et al. .............. | 345/168 |
| 6,104,317 A | * | 8/2000 | Panagrossi ................... | 341/20 |
| 6,204,839 B1 | * | 3/2001 | Mato, Jr. .................... | 345/168 |
| 6,222,528 B1 | | 4/2001 | Gerpheide et al. .......... | 345/173 |
| 6,286,064 B1 | | 9/2001 | King et al. ................... | 710/67 |
| 6,288,707 B1 | * | 9/2001 | Philipp ....................... | 345/168 |
| 6,307,548 B1 | | 10/2001 | Flinchem et al. ........... | 345/352 |

* cited by examiner

Primary Examiner—Sumati Lefkowitz
Assistant Examiner—Leland R. Jorgensen
(74) Attorney, Agent, or Firm—Charles W. Bethards

(57) ABSTRACT

A keypad system (FIG. 2) and corresponding method (FIGS. 3–4) suitable for use in a subscriber device (1) includes a capacitive touchpad 22 for detecting movement within a region, a driver device 12 coupled to the capacitive touchpad, wherein the driver device is for generating a touchpad data signal corresponding to the movement detected by the touchpad; and a controller 14 coupled to the driver device for receiving the touchpad data signal and for resolving the signal to one of a plurality of characters corresponding to the region. A keypad device 16 may be used for generating a key selection signal indicative of the region.

20 Claims, 4 Drawing Sheets

METHOD AND SYSTEM FOR PROVIDING A DISAMBIGUATED KEYPAD

FIELD OF THE INVENTION

The present invention relates generally to user interfaces, particularly alpha-numeric keypads and more specifically to methods and systems for providing a disambiguated alpha-numeric keypad.

BACKGROUND OF THE INVENTION

Conventional alpha-numeric keypads (keypads) of subscriber devices include a plurality of keys. A majority of the keys include a number and three or four letters printed thereon. For example, the number nine usually has "WXYZ" printed thereon. In many of these keypads a user must first press a text menu key and subsequently press a specific key several times for entering a text symbol. For example, a user must press the key with the number nine thereon four times in order to enter the text symbol "Z". Such a process for entering texts symbols is time consuming and error prone. Furthermore, this process becomes even more time consuming as well as cumbersome and inefficient when a user is attempting to write a text message with a multiplicity of alpha numeric key entries.

Therefore, what is needed is a method and device for providing fast and efficient text entry.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages all in accordance with the present invention.

DETAILED DESCRIPTION OF PREFERRED EMBODIMENT

In overview, the present disclosure concerns user interfaces such as alpha-numeric keypads (keypads) found, for example, on subscriber devices, such as cellular handsets, messaging devices, and most ordinary telephones. Note that subscriber device or unit may be used interchangeably herein with wireless device, mobile station or unit and each of these terms denotes a device ordinarily associated with a user and typically a wireless device that may be used with a public network in accordance with a service agreement or within a private network.

As further discussed below, various inventive principles and combinations thereof are advantageously employed to provide a disambiguated keypad, thus providing a more fast and efficient manner of text entry.

The instant disclosure is provided to further explain in an enabling fashion the best modes of making and using a preferred embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such software instructions, programs and ICs with minimal experimentation. Therefore, in the interest of brevity and minimization of any risk of obscuring the principles and concepts according to the present invention, further discussion of such software or ICs, if any, will be limited to the essentials with respect to the principles and concepts used by the preferred embodiments.

Figure 1:
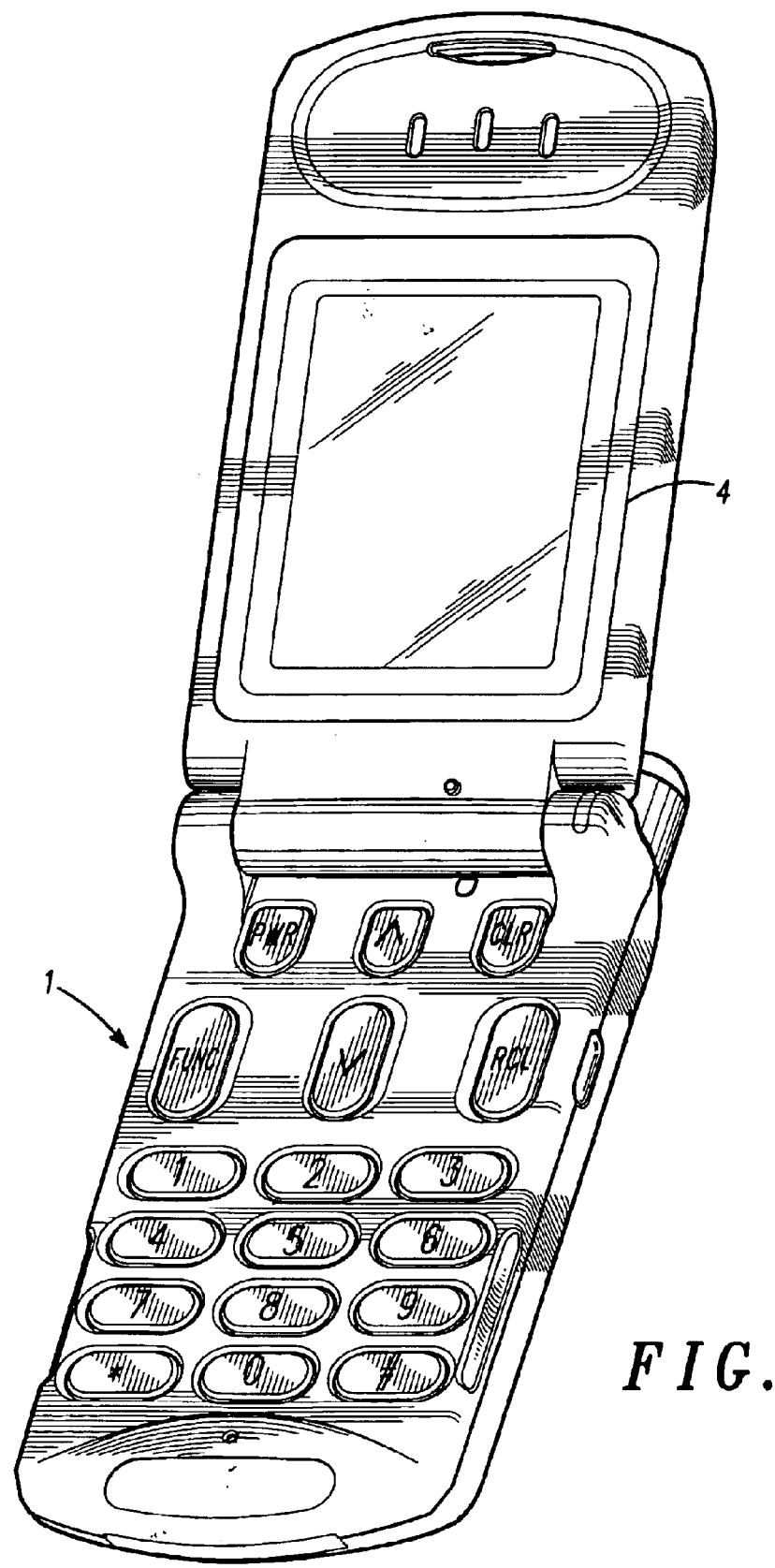
FIG. 1 depicts an exemplary subscriber device in which the system for providing a disambiguated keypad is implemented.
Figure 2:
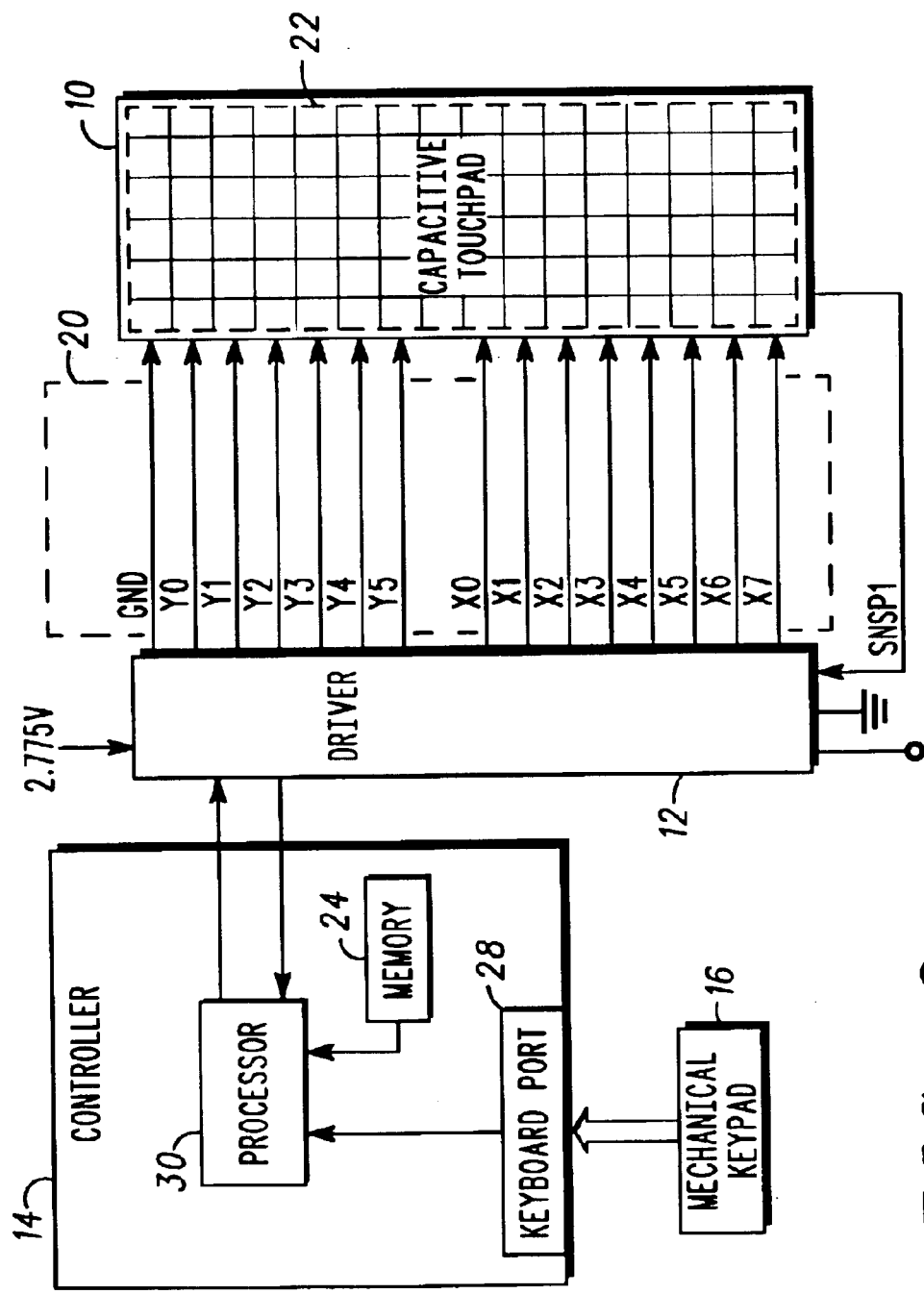
FIG. 2 illustrates a block diagram of a preferred embodiment of the system for providing a disambiguated keypad.

Referring to FIGS. 1–2, the system for providing a disambiguated keypad may be implemented in, for example, a subscriber device 1. Often, each key of the keypad may represent a multiplicity of different characters, for example a number and one of three or more alphabetic characters, such as "2 or a, b, or c" for the 2 key. The procedure and apparatus for determining which one of these multiple alphanumeric characters a key activation or sequence of activations is supposed to be may, for example, be referred to as resolving the particular key or disambiguating the particular key.

The subscriber device 1 includes several functional components shown as elements in the block diagram of FIG. 2. The subscriber device 1, includes inter coupled as depicted, a capacitive touchpad 10, a driver device 12, a controller 14, and a mechanical keypad (or keypad device) 16. These components will be discussed more fully below.

The capacitive touchpad (touchpad) 10 is adjacent and mechanically coupled to the mechanical keypad 16 and preferably disposed below the mechanical keypad 16. The touchpad 10 is for detecting movement of, for example, a user's finger, within a region defined by, for example, the outer perimeter of a key 2 (see FIG. 5). The touchpad 10 is further for detecting a direction of the movement within the region. The touchpad 10 is, preferably, composed of horizontal wires (at least one) and vertical wires (at least one) disposed adjacent to the horizontal wires so that either, each of the vertical wires crosses over the horizontal wires or each of the horizontal wires crosses over the vertical wires. The cross over between each of the horizontal and vertical wires define a wire grid 22. Each of the horizontal and vertical wires is electrically coupled to a signal output from the driver device 12. Electrical charges received from the driver device 12, via the signal outputs, travel through the wire grid 22. The wire grid 22 in conjunction with the electrical charges defines a coordinate plane. As will be more fully discussed below, the touchpad 10 outputs a resultant signal (shown as SNSP1 in FIG. 2) to the driver device 12. This resultant signal is induced by interaction between movement of a user finger on the wire grid 22 and one or more of the electrical charges in the wire grid 22. The capacitive touchpad 10 may be a touchpad made by Cirque such as, for example, the Single-Chip Touchpad.

The driver device 12 is an integrated circuit electrically coupled to the touchpad 10 and the controller 14. More specifically, the driver device 12 includes a plurality of signal outputs (GND, Y0 . . . Y5, X0 . . . X7 depicted generally by 20) for driving a plurality of electrical charges and sending these electrical charges to the capacitive touchpad 10 for mapping the capacitive touchpad 10 into a coordinate plane. This may be done by, for example, directing electrical charges Y0–Y5 onto vertical wires of the wire grid 22 and electrical charges X0–X7 onto horizontal wires of the wire grid 22. The electrical charges are preferably sent sequentially so that they may be distinguished from each other. However, the electrical charges may also be sent at the same time but with different potential levels so that they may be distinguished from each other. The driver device 20 receives the resultant signal SNSP1 from the touchpad 10 and is able to match the resultant signal to a coordinate on the capacitive touchpad due to the sequential nature in which the pulse signals are sent. The driver device 12 subsequently generates a touchpad data signal corresponding to this resultant signal and sends it to the controller 14. The driver device 12 may be, for example, a known integrated circuit made by Cirque.

The controller 14 is preferably a baseband processor. The controller 14 includes a memory 24, a keyboard port 28 and a processor 30. As those skilled in the art should appreciate, the processor 30 operates in a known manner to control operation of the controller 14 and thus the driver device 12 based upon software instructions (not shown) stored in the memory 24. The keyboard port 28 is for providing electrical coupling between the key switches of the mechanical keypad 16 and the controller 14. The memory 24 may be a combination of known RAM, ROM, EEPROM or magnetic memory. The memory 24 includes a plurality of lookup tables (not shown) stored therein. However, the lookup tables may alternatively be stored in an external memory. Each of the plurality of lookup tables, preferably corresponds to a specific key of the mechanical keypad 16 and is comprised of a table of touchpad data signal values and corresponding character values. The controller 14 is also electrically coupled to the driver 12 via, for example, a wired connection for receiving the touchpad data signal(s) generated by the driver device 12. The controller 14 resolves the touchpad data signal(s) as one of a plurality of character values by, preferably, matching this touchpad data signal(s) to a touchpad data signal in one of the lookup tables and finding its corresponding character value.

The mechanical keypad 16 may be a known physical keypad or virtual keypad. The mechanical keypad 16 includes a plurality of keys (see FIG. 1) and respective key switches (not shown). The key switches are for detecting pressing of or pressure on (selection of) one of the plurality of keys, respectively and for outputting a selection indication signal corresponding to one of the plurality of keys to the controller 14. The keys switches may also output the selection indication signal having or demonstrating a corresponding time duration of the pressing. As mentioned above, the mechanical keypad 16 may be electrically coupled to the controller 14 via the keyboard port 28. The mechanical keypad 16 is preferably disposed above the capacitive touchpad 10 so that a user can easily make directional movements subsequent to pressing one of the plurality of keys.

Figure 3:
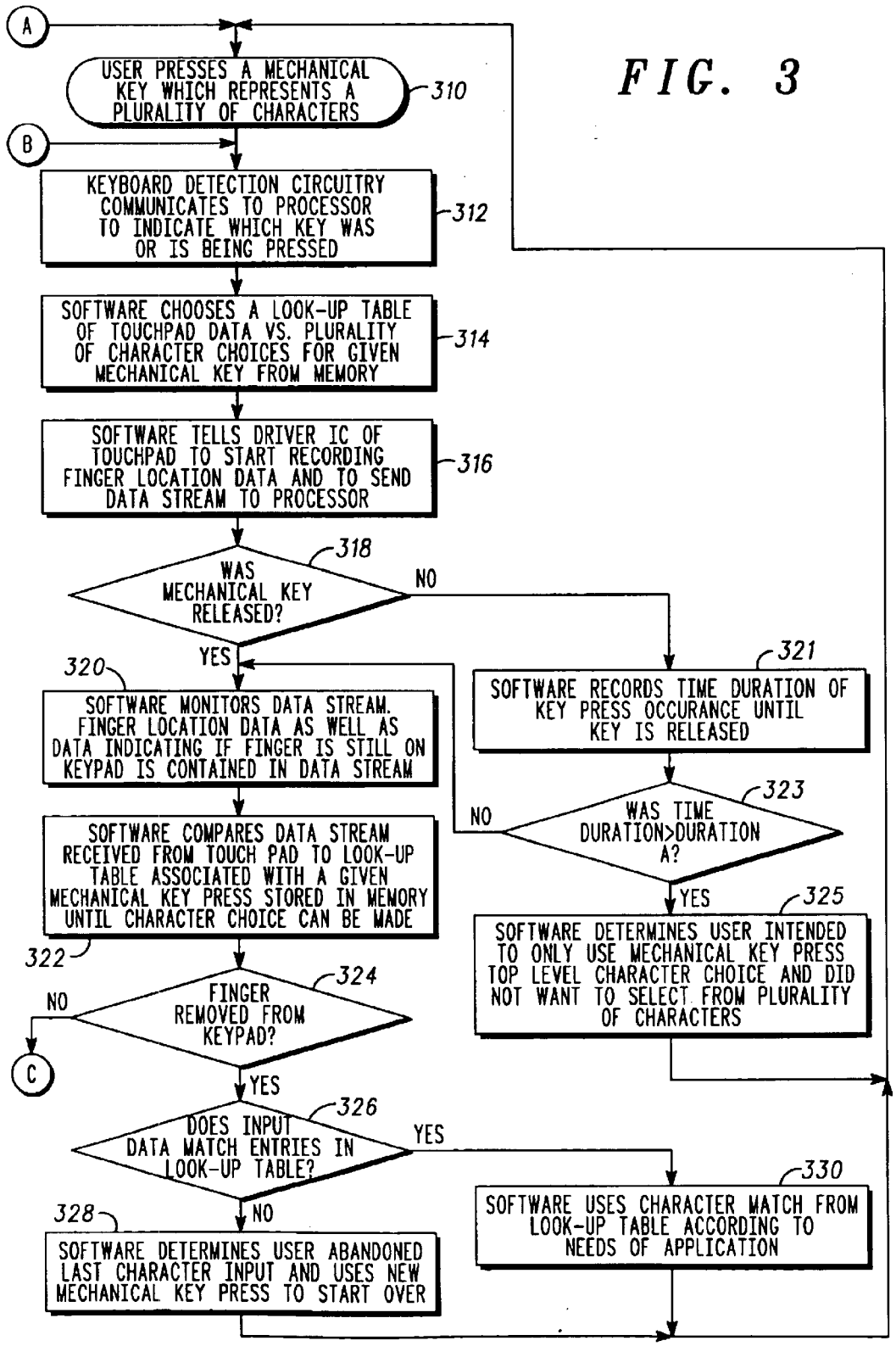
FIGS. 3–4 illustrate a flow chart of a preferred methodology of operation of the subscriber device of FIG. 1.
Figure 4:
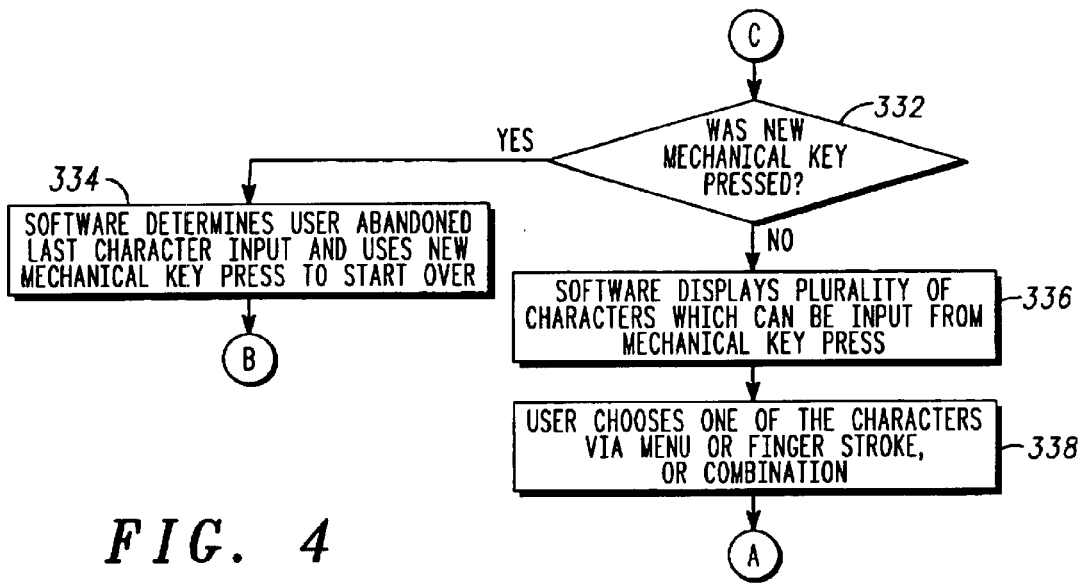

Referring to FIGS. 3–4, a method of operation of the disambiguated keypad of the subscriber device 1 will now be discussed in view of the elements illustrated in FIGS. 1–2. At 310, a user presses one of the keys of the mechanical keypad 16. The pressed key represents a plurality of characters, for example, text symbols and a number. The key switches of the mechanical keypad 16 detect the actuation or the pressing of (or pressure on) a key and generate a key selection signal indicative of the pressed key. At 312, the mechanical keypad 16 communicates this key selection signal to the processor 30 via the keyboard port 28.

At 314, the processor 30, preferably, selects one of a plurality of lookup tables stored in the memory 24. Each of the plurality of lookup tables corresponds to one of the keys and represent or corresponds to touch pad data. Accordingly, the processor 30 selects one of the plurality of lookup tables based upon the key selection signal.

At 316, the processor 30, based on software instructions stored in the memory 24, commands the driver 12 to begin recording finger location data of the user and to send a data stream to the processor 30. The driver 12 then sequentially sends the electrical charges to the wire grid 22 of the capacitive touchpad 10 for defining the coordinate plane. As those skilled in the art should appreciate, when a user touches the capacitive touchpad 10 and thus a particular wire intersection (between a horizontal and vertical wire) or vicinity thereof of the wire grid 22, the potential of the pulse signal in that particular wire intersection or vicinity will be changed or distorted. This changed or distorted potential signal, received by the driver device 12, will be referred to as a resultant signal. The driver device 12 converts the resultant signal to a touchpad data signal and sends it to the processor 30. The driver device 12 is able to also record direction of the pressing by recording the change in the different pulse signals for each wire and continuing to send touchpad data signals to the processor 30 as part of the data stream.

At 318, the processor 30 determines if the key was released. This determination can be done via the electrical coupling between the processor 30 and the mechanical keypad 16 at the keyboard port 28. If the processor 30 determines that the key was not released, then at 321 the processor 30 measures the time duration of the pressing or time lapsed while the key is pressed. This is done, preferably, by utilizing an internal clock (not shown) in the controller 14. Alternatively, the key switches of the mechanical keypad 16 could measure and report this time duration. At 323, the processor determines if the time duration was greater than a predetermined time period, A. This time duration may be user selectable and could be, for example, 1–3 seconds. If the processor 30 determines that the time duration is greater than the predetermined time period, then, at 325, the processor 30 uses the top-level character choice of the key pressed and the method recycles to the beginning. For example, referring to the key 2 of FIG. 5, the top-level character is the number two.

If, at 323, the processor 30 determines that the time duration is not greater than the predetermined time period, A, or, if, at 318, the processor 30 determines that the key was released, then at 320 the processor 30 begins to monitor the input data stream of touchpad data signals received from the driver device 12 as well as whether or not the finger is still on the capacitive touchpad 10 (whether or not a resultant signal is present). The touchpad data signals will be indicative of the current location of the finger on the wire grid 22.

At 322, the processor 30 compares the touchpad data signals received from the driver in the input data stream to touchpad data signals and associated character values in the lookup table selected at 314. Upon finding a touchpad data signal in the lookup table that matches or correlates or corresponds to the touchpad data signals received from the driver, the processor 30 may be able to resolve the touchpad data signals of the data stream to one of the character values associated with the found touchpad data signal thereby removing any ambiguity or disambiguating the key pressed or activated. The manner by which the processor 30 matches the touchpad data signals received from the driver to a touchpad data signal in the lookup table can be done by conventional known database searching and matching techniques.

At 324, the processor 30 determines if the user has removed his/her finger from the capacitive touchpad 10. This may be accomplished by merely monitoring the touchpad data signals from the driver 12.

If, at 324, the processor 30 determines that the user has removed his/her finger from the capacitive touchpad 10, at 326 the processor 30 determines if the input data stream matched or corresponded to or correlated with one of the character value entries in the lookup table. More specifically, the processor 30 determines if it was able to successfully resolve the data stream of touchpad data signals to a character value of a plurality of character values at 326. If the processor 30 determines that the input data stream matched one the character values at 326, then at 330 the processor 30 uses this character value according to the application needs of the subscriber device 1 and the process returns to the beginning.

If, at 326, the processor 30 determines that the input data stream did not match any of the character values at 322, then at 328 the processor 30 concludes that the user abandoned the last input data stream and returns to 310 to start over.

If, at 324, the processor 30 determines that the user has not removed his/her finger from the capacitive touchpad 10, then at 332 (FIG. 4) the processor 30 determines if a new mechanical key was pressed. If the processor 30 determines that a new mechanical key was pressed, then at 334 the processor 30 concludes that the user abandoned the last input data stream and uses the new mechanical key for starting over at 312.

If, at 332, the processor 30 determines that a new mechanical key was not pressed, then at 336 the processor 30 displays a plurality of characters that can be input or selected based upon the key pressed at 310. These characters may be displayed by the display 4 of the subscriber device 1. At 338, the user chooses one of the characters from a menu, finger movement or a combination of both.

Figure 5:
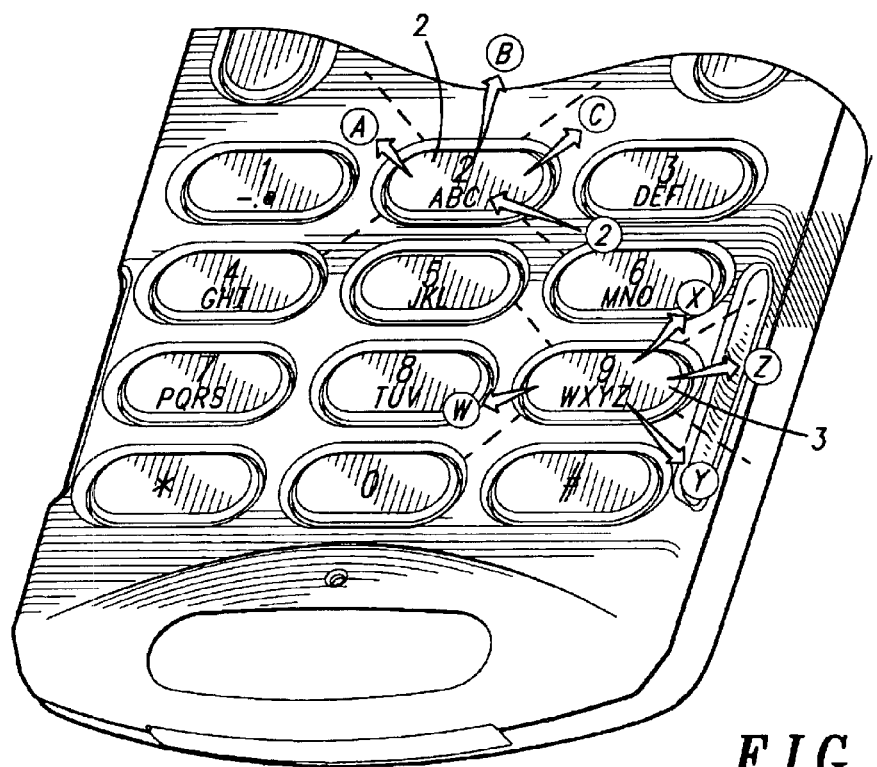
FIG. 5 illustrates operation of the subscriber device of FIG. 1.

Referring to FIG. 5, operation of the subscriber device 1 with the disambiguated keypad will be discussed. Initially, operation of the subscriber device 1 will be discussed for entering the text symbol A. The user will initially press the key 2 with the number two thereon. The mechanical keypad 16 will resultantly generate a key selection signal corresponding to the selection of this key 2. The processor 30 will receive this key selection signal via the keyboard port 28 and will choose a lookup table stored in memory 24 that corresponds to this key 2. If the user subsequently releases the key 2 and slides the user's finger in the northwest direction as shown in FIG. 5 (arrow pointing toward A), the user's finger will begin to interact with the electrical charges in the wire grid 22 of the touchpad 10. More specifically, the user's finger will induce a differential potential value on the region of the wire grid to the northwest of this key 2. A signal corresponding to this differential potential value (resultant signal) will be output to the driver 12. The driver 12 will subsequently send a data stream of touchpad data signals to the processor 30. The processor 30 will look in the selected look up table for matching the data stream of touchpad data signal to a character value, and will subsequently match this data stream to the character A. The letter B or C could have been selected by the user sliding the user's finger in the north or northeast directions, respectively.

Also, if the user intended to enter the number two, the user would simply maintain pressure on the key 2 for a time duration that is longer than a predetermined time period (see 323 of FIG. 3).

If the user would like to enter the text Z, the user will initially press the key 3 with the number nine thereon. The processor 30 would operate in the above-described manner so that the user could select the character Z by sliding the finger off the key and in the east direction. Note much of the preferred logic discussed herein may be changed without deviating from the spirit and scope of the present invention. For example a reasonably short key activation, without or without a finger slide, may result in selection of a numeric value whereas a relatively longer activation including a finger slide in a particular direction may represent a particular alpha character. One of ordinary skill in view of the disclosure, principles and concepts discussed and described herein will likely be prepared to develop other logical approaches.

Therefore, the present invention advantageously provides a method and device for disambiguating a plurality of keys for a mechanical keypad by permitting a user to select a particular character by sliding the user's finger in a particular direction. As a result, a user will be able to enter text in a more efficient manner.

While the above description is of the preferred embodiment of the present invention, it should be appreciated that the invention may be modified, altered, or varied without deviating from the scope and fair meaning of the following claims. For example, the directions assigned to a particular character shown in FIG. 5 could be changed. In addition, the mechanical keypad could be replaced by merely using the capacitive touchpad to select a key. This can be done by further utilization of the pulse signals in the wire grid. Finally, the lookup table may be replaced by an alternative internally or externally stored data source of touchpad data signals and corresponding disambiguating character data.

The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A keypad system comprising:
   a mechanical keypad configured to select a region from a plurality of regions and provide a corresponding keypad selection signal;
   a capacitive touchpad for detecting movement within the region;

a driver device electrically coupled to the capacitive touchpad, wherein the driver device is for generating a touchpad data signal corresponding to the movement detected by the capacitive touchpad; and a controller electrically coupled to the corresponding keypad selection signal and the driver device for receiving the touchpad data signal generated by the driver device and for resolving the touchpad data signal as one of a plurality of character values corresponding to the region.

2. The keypad system of claim 1, wherein:

the capacitive touchpad is further for detecting a direction of the movement within the region; and the driver device is for generating the touchpad data signal to correspond to the direction of the movement.

3. The keypad system of claim 1, wherein the controller is further for resolving the touchpad data signal in accordance with a lookup table stored in a memory, wherein the lookup table is comprised of touchpad data signal values and corresponding character values.

4. The keypad system of claim 1, wherein the driver device is further for sending a plurality of pulse signals to the capacitive touchpad for mapping the capacitive touchpad into a coordinate plane.

5. The keypad system of claim 4, wherein the capacitive touchpad is further for detecting a direction of the movement in a specific region by outputting a resultant signal induced by interaction between the movement and one or more of the plurality of pulse signals to the driver.

6. The keypad system of claim 5, wherein the driver device comprises a signal processing integrated circuit for processing the resultant signal and for generating the touchpad data signal to correspond to the resultant signal.

7. The keypad system of claim 5, wherein the mechanical keypad is adjacent and mechanically coupled to the capacitive touchpad and the mechanical keypad includes a plurality of mechanical keys that correspond, respectively, to the plurality of regions.

8. The keypad system of claim 7, wherein the controller is electrically coupled to the mechanical keypad and the controller is further for selecting one of a plurality of lookup tables stored in a memory, wherein the plurality of lookup tables correspond to the plurality of mechanical keys, respectively.

9. The keypad system of claim 7, further comprising:

a memory electrically coupled to the controller, wherein the memory includes a plurality of lookup tables stored therein and the plurality of lookup tables correspond to the plurality of mechanical keys.

10. The keypad system of claim 1, wherein the capacitive touchpad comprises a plurality of horizontal and vertical wires for defining a wire grid.

11. A keypad system comprising:

a keypad device that includes a plurality of keys and respective key switches for outputting a selection indication signal corresponding to a selection of one of the plurality of keys to a controller;

a memory electrically coupled to the controller, the memory including a plurality of lookup tables corresponding to the plurality of keys, respectively, whereby one of the plurality of lookup tables corresponds to the selection indication signal;

a capacitive touchpad adjacent and mechanically coupled to the keypad device; and a driver device electrically coupled to the controller, wherein the driver device is for outputting a plurality of pulse signals to the capacitive touchpad sensor, wherein:

the capacitive touchpad includes a wire grid for outputting a resultant signal induced by interaction between movement and one of the plurality of pulse signals to the driver device; and the controller is for resolving the resultant signal to a character value in accordance with the one of the plurality of lookup tables.

12. The keypad system of claim 11, wherein the selection indication signal output by the keypad device is further corresponding to a time duration of the selection.

13. The keypad system of claim 11, wherein the controller is further for:

determining if a time duration of the selection indication is in accordance with a predetermined time period; and resolving the signal received from the driver device in accordance with the one of the plurality of lookup tables only if the time duration is in accordance with the predetermined time period.

14. A method for disambiguating a plurality of characters for a mechanical keypad comprising:

detecting activation of one of a plurality of keys of the mechanical keypad and generating a key selection signal indicative of the one of the plurality of keys;

detecting movement on a capacitive touchpad and outputting a resultant signal indicative thereof; and resolving the resultant signal as one of the plurality of characters based upon the resultant signal and the key selection signal.

15. The method of claim 14, wherein the detecting of movement on a capacitive touchpad and outputting a resultant signal indicative thereof comprises driving a plurality of pulse signals to the capacitive touchpad and detecting the resultant signal induced by the movement on the capacitive touchpad interacting with one of the plurality of pulse signals.

16. The method of claim 14, further comprising:

selecting one of a plurality of lookup tables stored in a memory based upon the key selection signal, wherein;

the resolving of the resultant signal as one of the plurality of characters further comprises resolving the resultant signal based upon the one of the plurality of lookup tables.

17. The method of claim 14, wherein the detecting activation of one of a plurality of keys of the mechanical keypad further comprises detecting a time duration of a pressure.

18. The method of claim 17, wherein the detecting movement on a capacitive touchpad and outputting a resultant signal indicative thereof further comprises detecting a direction of the movement and outputting the resultant signal to be also indicative of the direction.

19. The method of claim 18, further comprising:

determining if the time duration is in accordance with a predetermined time value; and wherein the resolving of the resultant signal as one of a plurality of character values further comprises resolving the resultant signal only if the determining if the time duration is in accordance with a predetermined time value determines that the time duration is in accordance with the predetermined value.

20. The method of claim 17, wherein the resolving the key selection signal as one of a plurality of character values further comprises:

displaying the plurality of character values; and subsequently detecting a selection of the one of the plurality of character values.

* * * * *